(12) United States Patent
Citro et al.

(10) Patent No.: US 11,578,708 B2
(45) Date of Patent: Feb. 14, 2023

(54) SHAPE MEMORY ALLOY ACTUATOR SUBASSEMBLY WITH MAGNETIC ELEMENTS AND FLUIDIC VALVE INCORPORATING THE SAME

(71) Applicant: SAES GETTERS S.P.A., Lainate (IT)

(72) Inventors: Marco Citro, Varese (IT); Stefano Alacqua, Como County (IT); Stefano Mattia Franceschinis, Milan (IT)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 17/624,374

(22) PCT Filed: Jul. 17, 2020

(86) PCT No.: PCT/IB2020/056757
§ 371 (c)(1),
(2) Date: Jan. 3, 2022

(87) PCT Pub. No.: WO2021/014315
PCT Pub. Date: Jan. 28, 2021

(65) Prior Publication Data
US 2022/0349392 A1    Nov. 3, 2022

(30) Foreign Application Priority Data
Jul. 17, 2020   (IT) .................. 102019000012348

(51) Int. Cl.
*F03G 7/06*       (2006.01)
*F16K 31/08*      (2006.01)
(52) U.S. Cl.
CPC ..... *F03G 7/06143* (2021.08); *F03G 7/06147* (2021.08); *F16K 31/086* (2013.01); *F05B 2280/5006* (2013.01)
(58) Field of Classification Search
CPC .... F03G 7/06143; F03G 7/06147; F03G 7/06; F16K 31/086; F05B 2280/5006
USPC .............................. 60/527–529; 310/306–307
See application file for complete search history.

(56) References Cited

U.S. PATENT DOCUMENTS

| 2009/0236931 | A1 | 9/2009 | Takahashi | |
| 2011/0088387 | A1* | 4/2011 | Von Behrens | F03G 7/065 60/527 |
| 2011/0138801 | A1* | 6/2011 | Zimmer | A47B 88/457 60/527 |

(Continued)

FOREIGN PATENT DOCUMENTS

JP    2009075170 A    4/2009

OTHER PUBLICATIONS

International Search Report and Written Opinion dated Sep. 29, 2020 in PCT/IB2020/056757, 10 pages.

*Primary Examiner* — Hoang M Nguyen
(74) *Attorney, Agent, or Firm* — Element IP, PLC (57) ABSTRACT

The present invention relates in a first aspect to an actuator subassembly comprising a shape memory alloy wire (15), a biasing spring (16) and magnetic responsive elements (17, 17') to couple the movement of a first movable element (13) and a second movable element (14) provided with a terminal (18), and in a second aspect to a fluidic valve comprising a plunger whose terminal part controls its opening and closing and where the plunger movement is controlled by the action of a shape memory alloy wire, a biasing element and magnetic responsive elements.

18 Claims, 6 Drawing Sheets

(56) References Cited

U.S. PATENT DOCUMENTS

| | | | |
|---|---|---|---|
| 2012/0151913 A1* | 6/2012 | Foshansky | F16K 31/003 60/527 |
| 2013/0111896 A1* | 5/2013 | Foshansky | F03G 7/065 60/527 |
| 2014/0007571 A1 | 1/2014 | Jee | |
| 2014/0007572 A1 | 1/2014 | Buravalla et al. | |

* cited by examiner

SHAPE MEMORY ALLOY ACTUATOR SUBASSEMBLY WITH MAGNETIC ELEMENTS AND FLUIDIC VALVE INCORPORATING THE SAME

The present invention relates in a first aspect to an actuator subassembly comprising a shape memory alloy (SMA) wire and magnetically coupled movable elements to move an element with a terminal part.

Actuator assemblies and actuating systems employing shape memory alloy wires are known in the art and are becoming increasingly diffused due to recent developments improving their reliability and robustness that allow to fully exploit their intrinsic advantages, such as compactness, ease of integration. For example, the international patent application WO 2016/156283 in the Applicant's name relates to a lock having an emergency actuator, the European patent number 2615951 in the Applicant's name describes an actuating system for a valve installed in a multi-beverage vending machine, the European patent 2171183 in the Applicant's name describes an actuator having a broadened range of working temperatures, the international patent application WO 2015/150377 describes an actuating element in a household appliance.

In all these devices the features of a shape memory alloy (SMA) are exploited, more specifically the SMA material property of being characterized by a structural transition between two phases, namely the so-called Martensite phase, which is stable at a lower temperature, and the so-called Austenite phase which is stable at a higher temperature. A shape memory alloy is characterized by four temperatures, Mf, Ms, As, Af where Mf is the temperature below which the shape memory alloy is completely in the Martensite phase, i.e. it has a martensitic structure, while Af is the temperature above which the shape memory alloy is fully in the Austenite phase, i.e. it has an austenitic structure, and Ms, As are the temperatures at which the transition starts in the two directions.

Wires made of a shape memory alloy, also known as SMA wires, can be trained to change their shape when temperature changes from below Mf to above Af, and vice versa. Processing and training of SMA wires are widely known procedures in the field, as exemplified by the paper "Shape Memory Alloy Shape Training Tutorial" dating back to the Fall 2004 training section "ME559—Smart Materials and Structures".

It is also known that SMA wires start to shorten at a temperature equal to or higher than the Austenite start temperature As and reach their final length when heated at a temperature equal to or above the Austenite final temperature Af. The shape memory alloy wire controlled shortening, usually by heating through current passage (Joule effect), is used to displace one or more elements in the actuator.

Some actuators also couple the use of SMA wires with magnetic elements, in particular U.S. Pat. No. 8,528,597 describes the use of magnets as biasing means for a SMA wire-based actuator, to reduce the force to be exerted by the SMA wire to achieve actuation or to achieve a locking function. Also the US patent application 2009/0236931 describes the use of a couple of magnets, one of them fixed, to act as additional SMA wire biasing means.

US patent application 2008/0006112 is inherent to a gearing system describing in general terms a SMA wire with affixed a permanent magnet to achieve unlocking of a blocking member with affixed a second permanent magnet.

US patent application 2012/0151913 describes a valve control module controlling the fluidic part of the valve but isolated therefrom, and envisioning also a magnetic coupling as valve opening means.

Purpose of the present invention is to provide an actuator using a SMA wire and one or more sets of permanent magnets for reciprocating an element so that the coupled magnetically responsive elements, depending on the actuator status, provide the means to drive a movable actuator element and the means to speed up the return of the actuator in the rest position, and in a first aspect thereof consists in an actuator subassembly comprising:
  a first and second stationary surfaces,
  a first and second movable element,
  a shape memory alloy wire fixed onto the first stationary surface and connected to the first movable element to move the first movable element,
  a biasing means connected to the second stationary surface and to one of the movable elements acting in opposition to the driving force exerted by the shape memory alloy wire,
the first and second movable elements being magnetically coupled via magnetic responsive elements comprising one or more set of permanent magnets and a corresponding magnetic responsive element (i.e. magnets of opposite polarity and/or ferromagnetic material), so that the displacement of the second movable element is driven by the displacement of the first movable element upon actuation of the SMA wire and said magnetic coupling also provides for the return of both movable elements to their rest positions by the biasing means upon de-actuation of the SMA wire, wherein the second stationary surface is interposed between the first and second movable elements separating them, preferably in a fluid-tight manner.

The present invention provides also a more balanced actuator subassembly structure, i.e. the second movable element (the one carrying out the action of the actuator) is not subjected to asymmetrical forces as in the case of the first movable element, since the shape memory alloy wire attached thereto lies in a specific plane, thus resulting in a smoother functioning of the actuator subassembly.

Additionally, in a preferred embodiment of the actuator subassembly according to the present invention, the SMA wire and the biasing means are physically separated by the first movable element, being located on opposite sides thereof. Such a physical separation provides a greater design flexibility and ease of assembly of the actuator subassembly, especially considering that some actuator subassemblies can be adopted in microsystems, in that the SMA wire can be conveniently used not only in a linear configuration but also in the so-called U-shape configuration or V-shape configuration that allow for greater strength and/or travel of the SMA wire. An example of an actuator which is limited to the linear configuration is shown in the Japanese patent application 2009/075170, where a linear SMA wire and the biasing means are both concentrically connected between the first stationary surface and the first movable element, i.e. they are located on the same side of the latter, thus making substantially impossible to use any other configuration of the SMA wire.

It is important to underline that with the present configuration a higher degree of miniaturization is possible, since in this case the SMA actuator is fully integrated in the valve fluidic module, differently from what is described in the aforementioned US patent application 2012/0151913 in which a replacement control module is connected to the fluidic part of a valve. The most relevant differences between US 2012/0151913 and the present invention are the lack of separation between the shape memory alloy wire and the biasing means, and the fact that the magnetically responsive elements are not directly mounted on the movable elements but an intermediate element is required, adding encumbrance to the structure.

Another advantage of the configuration of the present invention is instead specifically linked to the fluidic valve application, as in this case the shape memory alloy wire will always be exposed to air, no matter the specific nature of the fluid (liquid, gas, mix), ensuring a better thermal management and control of the shape memory alloy wire and its actuation. This will also allow for a full proportionality of the valve rather than being restrained to a limited number of operative positions, as described in US 2012/0151913, such limitation being linked to the use of a bi-stable/tri-stable biasing means differently from the preferred embodiment of the present invention envisioning the use of a proportional bias, such as a spring, flexure, or the like.

It is to be underlined that first and second stationary surfaces are to be interpreted in the context of the actuator subassembly, more in details the actuator subassembly of present invention may be mounted on a movable device (e.g. a car), and as such they are stationary surfaces in relative terms.

The present invention will be further illustrated with the help of the following figures, where.

For clarity's sake, dimensions and dimensional ratios of the various parts shown in the drawings may have been altered, with particular and non-exclusive reference to the diameter of the shape memory alloy wire; moreover also some elements non-essential for the understanding of present invention have not been represented in the schematic views, for example shape memory alloy wire crimpings, electrical contacts, etc.

Figure 1A:
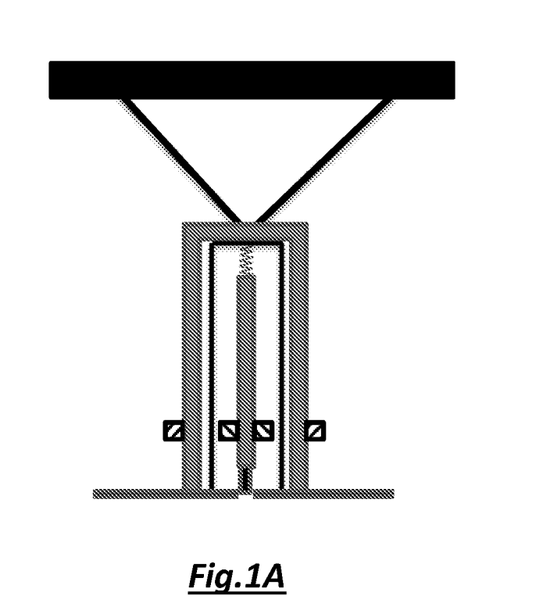
FIGS. 1A and 1B show a schematic cross-sectional view of a first embodiment of an actuator subassembly according to the present invention, respectively in the unactuated and actuated state.
Figure 1B:
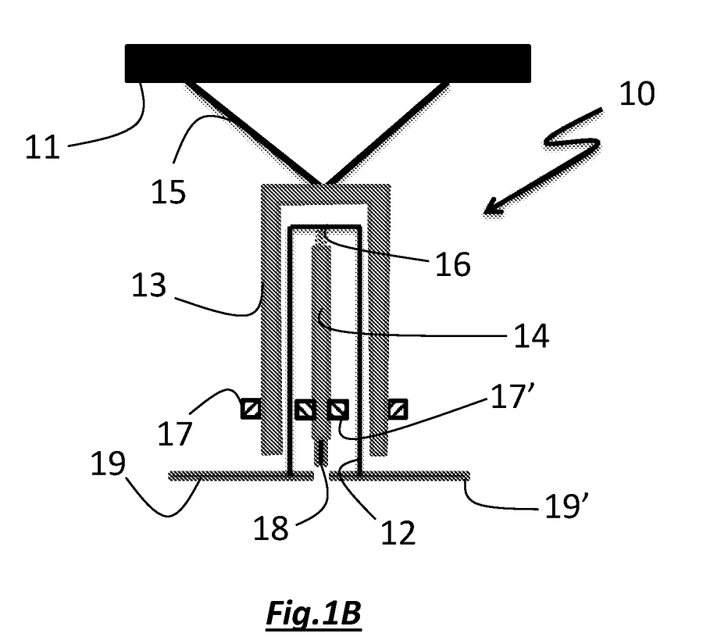

FIGS. 1A and 1B show a schematic cross-sectional view of a first embodiment of an actuator subassembly 10 according to the present invention respectively in the rest position (SMA wire in the unactuated state) and in the operative position (SMA wire in the actuated state).

The actuator subassembly 10 comprises a first top stationary surface 11, a second bottom stationary surface 12, a first movable element 13 located outside of element 12 and a second movable element 14 located inside of element 12, the two movable elements 13, 14 being preferably co-axial with respect to each other. Displacement of the first movable element 13 is caused by a shape memory alloy wire 15 in the so called V-shape configuration, with its extremities fixed onto the first stationary surface 11 and its central portion fixed/connected to the first movable element 13.

Upon actuation of the shape memory alloy wire 15, the first movable element 13 rises and brings upward also the second movable element 14 through the attractive force of a first magnet 17 mounted on the first movable element 13 and a second magnet 17' mounted on the second movable element 14.

Upon de-actuation of the SMA wire 15, it is the second movable element 14 that pulls down the first movable element 13 through the magnetic attraction of magnets 17, 17' toward its rest position by means of a biasing element, in this case a spring 16 connected between the second stationary surface 12 and the second movable element 14.

In FIGS. 1A and 1B a terminal element 18 is represented affixed to the free tip of the second movable element 14 and characterized in its function by the relationship with the supports 19, 19' of the second stationary surface 12. More specifically, the present invention is not limited to a specific shape, material or purpose for the terminal 18, for example it could be an electric terminal for contacting elements 19, 19', or it could be a plunger to close an opening in a fluid circuit (in this case 19 and 19' being the walls of the opening) or door locks, magnetic clutches.

The schematic cross-sectional representations of FIGS. 1A and 1B show a subassembly using two magnets 17 and 17' of opposite polarity, the magnets being in the form of rings respectively attached to the first movable element 13 and to the second movable element 14.

Figure 2A:
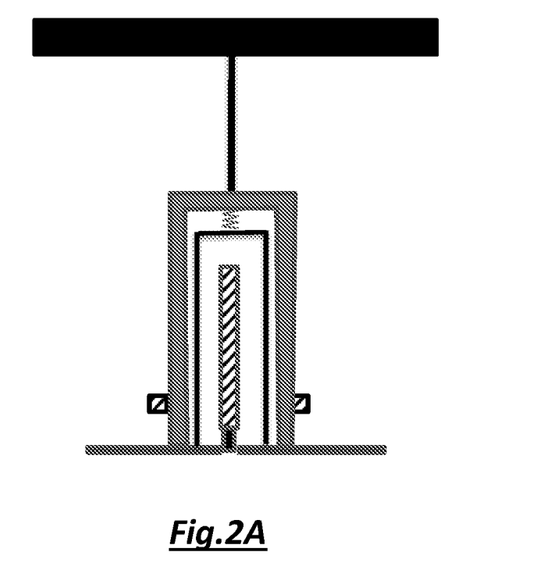
FIGS. 2A and 2B show a schematic cross-sectional view of a second embodiment of an actuator subassembly according to the present invention, respectively in the unactuated and actuated state.
Figure 2B:
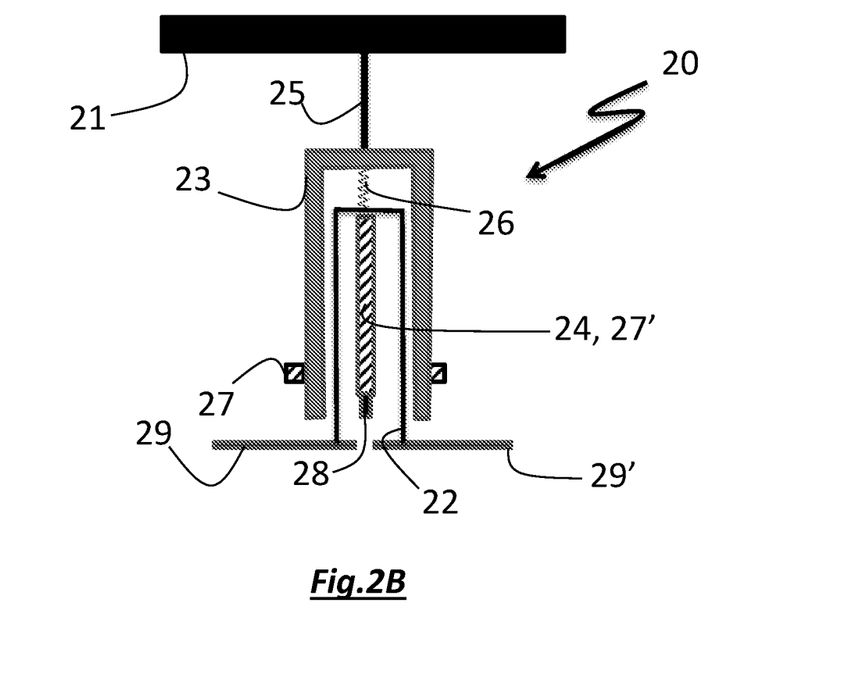

FIGS. 2A and 2B show a schematic cross-sectional view of a second embodiment of an actuator subassembly 20 according to the present invention respectively in the rest position (SMA wire in the unactuated state) and in the operative position (SMA wire in the actuated state).

The most important structural difference with respect to the first embodiment shown in FIGS. 1A and 1B is the positioning of the biasing element/return spring 26, now connected between the first movable element 23 and the second stationary surface 22, and thus exerting a pulling action rather than a pushing action as spring 16.

The different positioning of the return elements 16 in FIGS. 1A-1B and 26 in FIGS. 2A-2B highlights the two main configurations of an actuator subassembly according to the present invention.

Other differences present in actuator subassembly 20, which are mere variants and as such could be applied also to the configuration of the actuator subassembly 10, are:
  a shape memory alloy wire 25 in a straight/linear configuration, with one of its extremities fixed to the first stationary surface 21 and the other one fixed to the first movable element 23;
  the second movable element 24 that now is made with a magnetic material 27' for magnetic coupling with a magnetic element 27 mounted on the first movable element 23.

Similarly to FIG. 1A, a terminal element 28 at the tip of the second movable element 24 determines the actuator subassembly scope and function through its relationship with subassembly elements 29, 29' that act as supports for the second stationary surface 22.

Figure 3A:
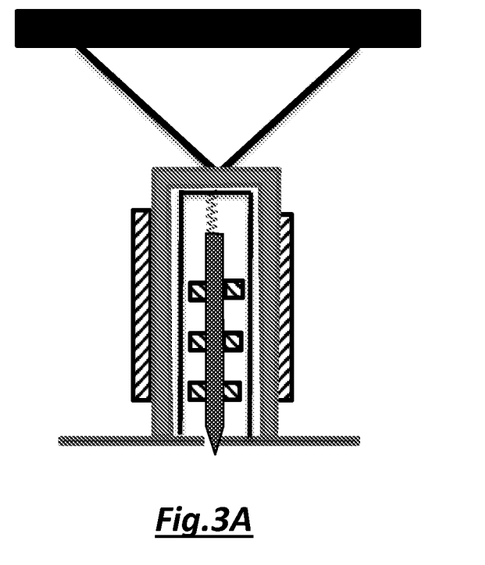
FIGS. 3A and 3B show a schematic cross sectional view of a third embodiment of an actuator subassembly according to the present invention, respectively in the unactuated and actuated state.
Figure 3B:
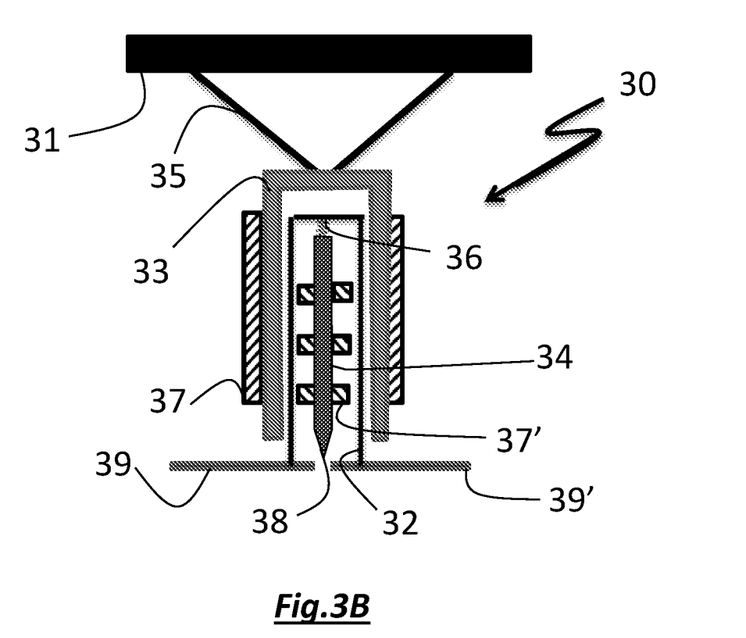

FIGS. 3A and 3B show a schematic cross-sectional view of a third embodiment of an actuator subassembly 30 respectively in its rest position and in its operative position. As in the first embodiment shown in FIGS. 1A-1B, also in this case there is a bias spring 36 connected between the second movable element 34 and the second stationary surface 32. In this case, the terminal 38 is not an element affixed to the second movable element 34 but it is rather a part thereof, in particular a tip portion, that is most suitable for fluidic valve port sealing, whereby supports 39, 39' of the second stationary surface 32 will represent part of a valve wall or more generally valve insulating elements.

In actuator subassembly 30 a SMA wire 35 in a V-shape configuration connects a first stationary surface 31 with a first movable element 33 carrying a magnetic element 37, preferably a cylinder with a significant longitudinal extension, while a plurality of smaller ring-shaped magnetic elements 37' are mounted spaced apart along the second movable element 34. Upon actuation of the SMA wire 35, the first movable element 33 rises and brings upwards the second movable element 34 through the magnetic coupling of magnetic element 37 with the plurality of magnetic elements 37'. Upon cooling of the SMA wire 35, it is the second movable element 34 that pulls down through said magnetic coupling the first movable element 33 thanks to the push of the biasing spring 36 connected between the second stationary surface 32 and the second movable element 34.

Figure 4A:
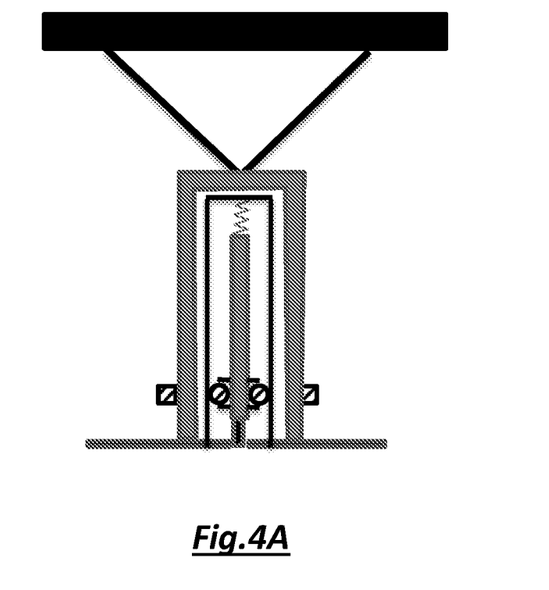
FIGS. 4A and 4B show a schematic cross-sectional view of a fourth embodiment of an actuator subassembly according to the present invention, respectively in the unactuated and actuated state.
Figure 4B:
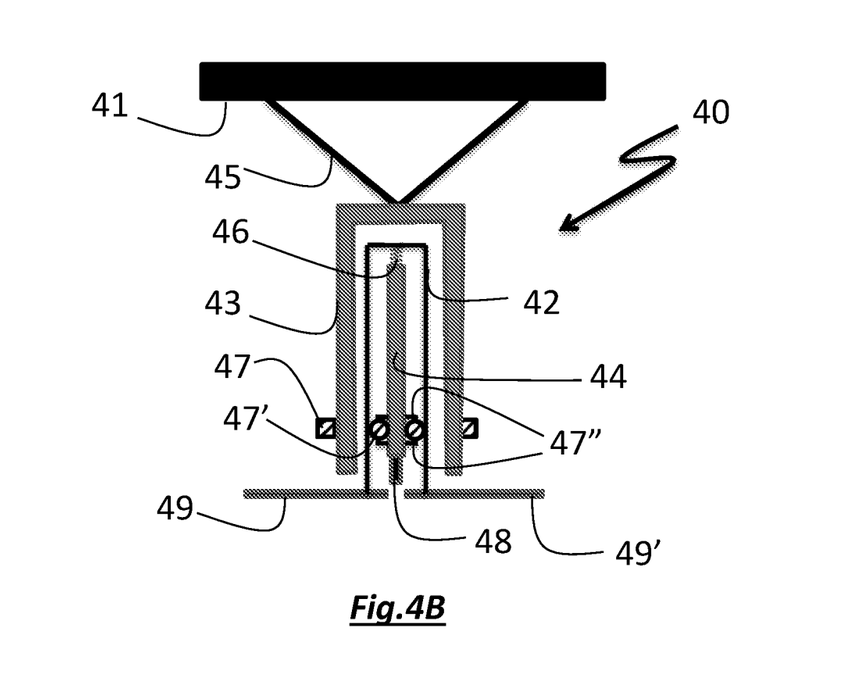

FIGS. 4A and 4B show a schematic cross-sectional view of a fourth embodiment of an actuator subassembly 40 respectively in its rest position and in its operative position. The structure is almost identical with the first embodiment shown in FIGS. 1A-1B, comprising a first top stationary surface 41, a second bottom stationary surface 42, a first movable element 43, a second movable element 44, a SMA wire 45 in V-shape configuration, a bias spring 46 connected between the second movable element 44 and the second stationary surface 42, magnetic elements 47, 47' respectively mounted on the first and second movable elements 43, 44, and a terminal 48 at the tip of the second movable element 44 to make contact with the supports 49, 49' of the second stationary surface 42.

The only difference is given by the fact that the magnetic elements 47' mounted on the second movable element 44 are also in contact with the second stationary surface 42, and therefore have a circular cross-section to minimize friction when there is the upward pull by the magnetic element 47 during the actuation of the SMA wire 45 fixed to the first movable element 43, and when there is the downward push by the bias spring 46 upon de-actuation of the SMA wire 45. To this purpose, the magnetic elements 47' are mounted such that they can rotate during the relative motion between the second stationary surface 42 and the second movable element 44, e.g. they are arranged between upper and lower ledges 47'' integral with the second movable element 44 and sized to avoid contact with the second stationary surface 42 while preventing the rotating magnetic elements 47' from falling away.

Figure 5A:
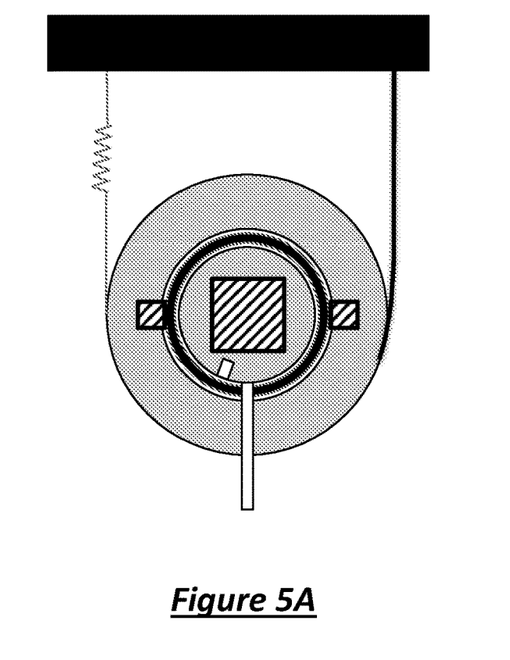
FIGS. 5A and 5B show a schematic cross-sectional view of a fifth embodiment of an actuator subassembly according to the present invention, respectively in the unactuated and actuated state.
Figure 5B:
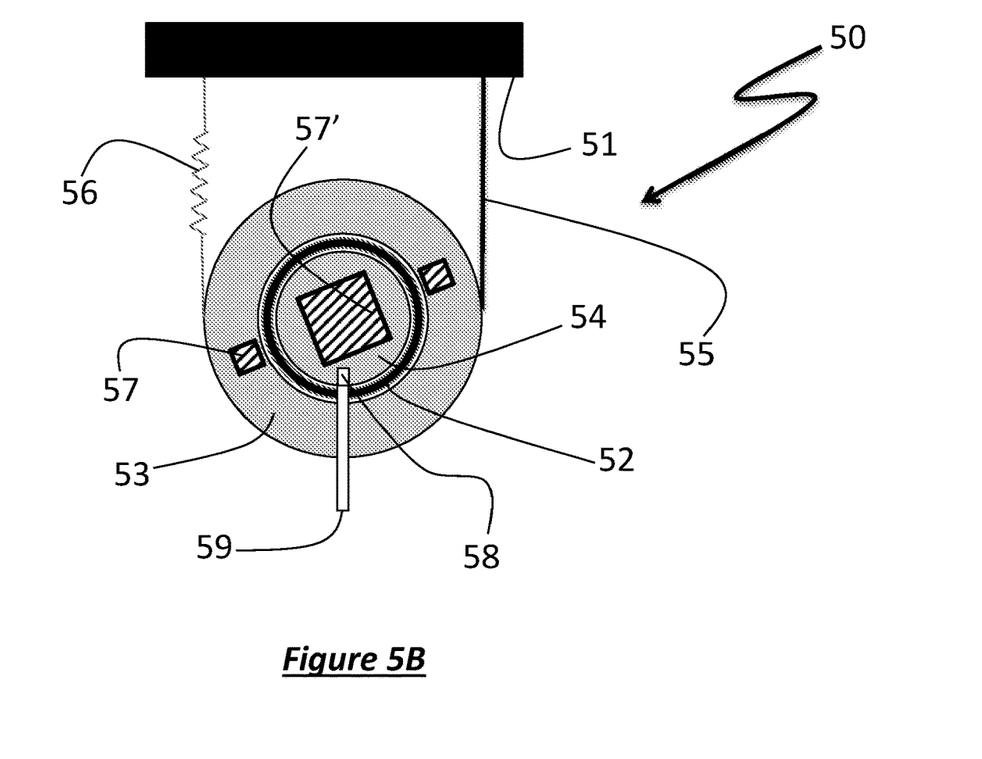

In all the embodiments shown in FIGS. 1-4 the actuator subassembly shows a linear movement of the movable element, but the same concept may be advantageously applied to rotary actuators, as exemplified in FIGS. 5A and 5B showing a schematic cross-sectional view of a fifth embodiment of an actuator subassembly 50 according to the present invention, respectively in the unactuated and actuated state.

More specifically, actuator subassembly 50 comprises first and second circular concentric movable elements 53, 54 with magnetic responsive elements 57, 57' that are respectively mounted thereon. A shape memory alloy wire 55 is connected between a first stationary surface 51 and a point on the external circumference of the first movable element 53 in a substantially tangential manner, while an elastic element 56 that opposes the pulling action of the SMA wire 55 is connected between said first stationary surface 51 and another point on the external circumference of the first movable element 53 at a substantially opposite position also in a tangential manner.

A circular second stationary surface 52 is concentrically arranged between the two movable elements 53, 54 and supported by a radially extending support 59, while a contact element (terminal) 58 is mounted flush with the external circumference of the second movable element 54. Upon actuation of the SMA wire 55, the first movable element 53 is rotated (counter-clockwise in the illustrated example of FIGS. 5A, 5B) and in turn causes the rotation of the second movable element 54 through the coupled magnetic responsive elements 57, 57' thus causing terminal 58 to move along and align/make contact with support 59.

All the previously described embodiments show the advantage of the present invention, namely the coupled magnetic responsive elements fulfill two functions:
  driving of an actuator element upon SMA wire actuation (heating by current supply),
  speeding up the return of the actuator to the rest position once the SMA wire is de-actuated (no current supply).

As per above description, there are two main configurations for an actuator subassembly according to the present invention, in the first one the bias spring acts on the first movable element, in the second one it acts on the second movable element.

These two main embodiments can be implemented with various variants, some of which have already been shown with reference of the described figures, in particular:
  SMA wire configuration: among the most useful configurations a single SMA wires is used, preferably in a straight form, with one of its extremities fixed to the first stationary surface and the other one to the first movable element, or alternately in the so called V/U shape configurations, with both wire extremities fixed to the first stationary surface and a median portion fixed/connected to the first movable element,
  magnetic responsive elements: at least one permanent magnet set shall be present on either the first movable element or the second movable element, the magnetic responsive element on the other movable element can be one or more magnet sets of opposite polarity or one or more elements comprising or consisting of ferromagnetic material,
  the magnetic responsive elements may be fixed/connected to the first and second movable elements, but alternately the first and/or second movable element may incorporate or may be made with magnetic responsive elements/materials,
  the height of the magnetic responsive elements may be the same, or one of them may have an height encompassing more sets of the corresponding magnetic elements on the other movable element,
  the size and shape of the magnetic responsive elements may not be the same, in this regards a circular cross-section is preferred in case they are in contact with the second stationary surface,
  the first and second stationary surfaces may correspond to distinct actuator elements, or may be part of a single element, for example the actuator frame opportunely shaped,
  the actuator subassembly may have a linear or rotating movement All of the above variants are not limiting aspects of the present invention but only preferred solutions to be possibly used in combination in the two main embodiments of the actuator subassemblies.

Preferably, the magnetic responsive elements comprise a set of permanent magnets providing a magnetic drag force capable of compressing the bias spring avoiding any movement delay between the displacement of the first movable element (outer element in the depicted embodiments) and the displacement of the second movable element. The magnetic drag force is the force perpendicular to the magnetic attraction force and is the direct result of the shape memory alloy wire pull on the first movable element. The magnetic drag force must be comprised between 1 to 10 times the bias spring force, preferably between 1.5 and 5 times the bias spring force, and is easily obtainable by a person skilled in the art from permanent magnets data sheets.

Examples of suitable shape memory alloys to be used in the actuator subassembly according to present invention are Ni—Ti based alloys such as Nitinol, with or without additional elements chosen among Hf, Nb, Pt, Cu. Suitable diameters for the SMA wire actuator element are comprised between 25 and 500 µm.

In a second aspect thereof the invention consists in a fluidic valve comprising an actuator subassembly as described above.

In a particular embodiment the second stationary surface is fluid tight so that the shape memory alloy wire does not come in contact with the fluid, thus allowing to use fluids that by their nature and characteristics may damage the shape memory alloy wire, such as water, oil or refrigerant fluid (for example the so-called R410a). As already outlined, the contact with these fluids may impact the SMA wire actuation, typically achieved by heating through Joule effect.

Figure 6:
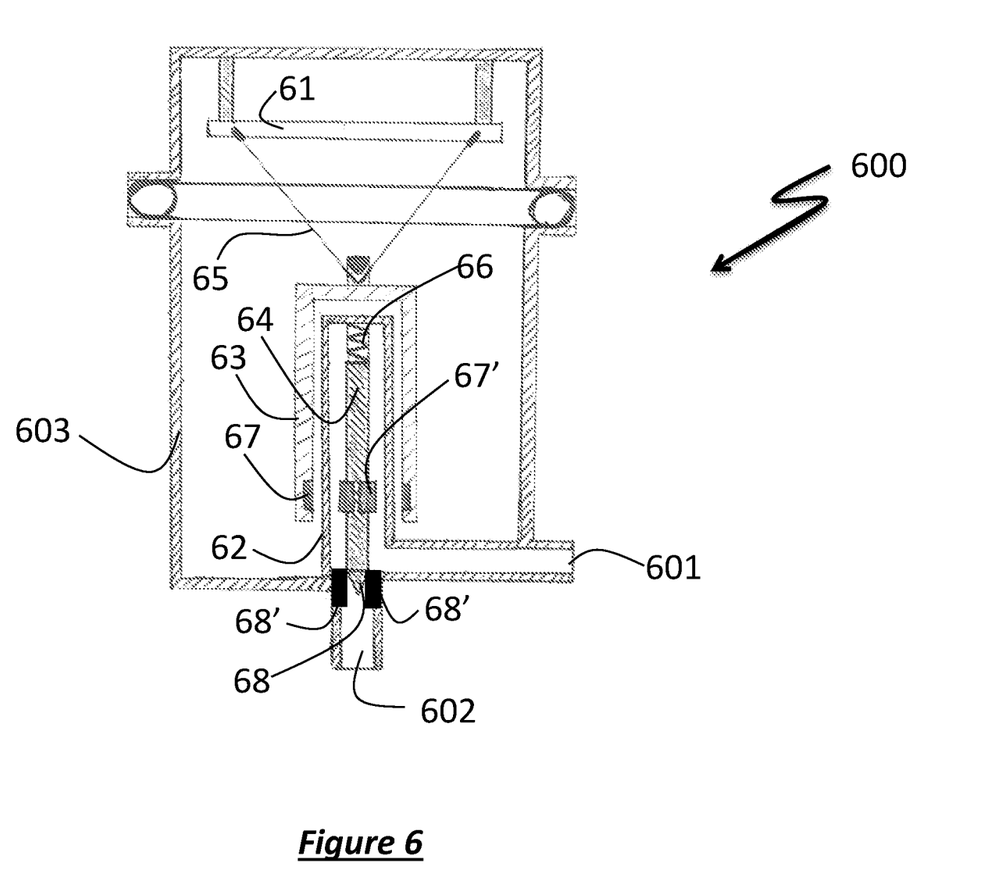
FIG. 6 shows a schematic cross-sectional view of a valve incorporating an actuator subassembly according to the present invention.

A schematic cross-sectional view of a fluidic valve 600 incorporating an actuator subassembly according to the present invention is shown in FIG. 6. Valve 600 has a fluid inlet 601 and a fluid outlet 602 that are selectively put into communication or isolated by means of a plunger, corresponding to the second movable element 64, having an appropriate terminal portion 68 for a fluid tight connection, possibly by means of a ring gasket 68' that is optional in case of a "perfect" matching between the dimensions of outlet 602 and terminal part 68, or it may be an element performing a flow control function, such as a calibrated orifice. The second movable element 64 and the first movable element 63 are separated from each other in a fluid-tight manner by the second stationary surface 62 that is supported by and connected to the valve body 603. A biasing spring 66 connects the second movable element 64 with the second stationary surface 62.

Valve 600 is shown in FIG. 6 in the so-called normally closed configuration, i.e. when the SMA wire 65 is in the unactuated state then inlet 601 and outlet 602 are isolated from each other. Upon actuation of the V-shaped SMA wire 65 connected between the first stationary surface 61 and the first movable element 63, the latter rises and by the action of the magnetic responsive elements 67 (present on the first movable element 63) and 67' (present on the second movable element 64), the second movable element/plunger 64 is dragged along upwards thus putting in fluidic communication inlet 601 with outlet 602.

When the shape memory alloy wire 65 is de-actuated, the biasing spring 66 pushes down the second movable element/plunger 64 to close valve 600 and in such movement also drags along the first movable element 63 toward its rest position through the magnetic coupling of elements 67, 67'.

The invention claimed is:

1. An actuator subassembly, comprising:
a first and second stationary surface;
a first and second movable element;
a shape memory alloy wire fixed onto said first stationary surface and connected to said first movable element to move it from a rest position to an operative position; and
a biasing means connected to one of said stationary surfaces and to one of said movable elements so as to act in opposition to the driving force exerted by said shape memory alloy wire,
wherein the first and second movable elements are connected by a magnetic coupling via magnetic responsive elements comprising one or more sets of permanent magnets on one of the movable elements and one or more corresponding magnetic responsive elements on the other movable element, so that a displacement of the first movable element upon actuation of the shape memory alloy wire results also in a displacement of the second movable element from a rest position to an operative position, said magnetic coupling also providing for the return of both movable elements to their rest positions by the biasing means upon de-actuation of the shape memory alloy wire,
wherein the second stationary surface is interposed between the first and second movable elements separating them, and
wherein both extremities of the shape memory alloy wire are fixed to the first stationary surface and its median portion is connected to the first movable element in a V-shape or U-shape configuration.

2. The actuator subassembly according to claim 1, wherein the one or more sets of permanent magnets have a drag force comprised between 1 and 10 times the force of the biasing means.

3. The actuator subassembly according to claim 1, wherein the magnetic responsive elements are respectively one or more permanent magnets and one or more ferromagnetic elements.

4. The actuator subassembly according to claim 1, wherein the magnetic responsive elements are respectively one or more permanent magnets of a first polarity and one or more permanent magnets of an opposite polarity.

5. The actuator subassembly according to claim 1, wherein the magnetic responsive elements are fixed to or constitute at least part of said first and second movable elements.

6. The actuator subassembly according to claim 5, wherein the second movable element is essentially made of a magnetic material.

7. The actuator subassembly according to claim 1, wherein the one or more sets of magnets and the magnetic responsive elements have substantially the same height.

8. The actuator subassembly according to claim 1, wherein the height of one of the magnetic responsive elements on one of the movable elements encompasses more than one set of magnets or more than one magnetic responsive element on the other movable element.

9. The actuator subassembly according to claim 1, wherein said first and second movable elements are co-axial or concentric with respect to each other.

10. The actuator subassembly according to claim 1, wherein the second stationary surface is physically contacted by the magnetic responsive elements mounted on the second movable element.

11. The actuator subassembly according to claim 10, wherein the magnetic responsive elements have a circular cross-section and are mounted such that they can rotate during the relative motion between the second stationary surface and the second movable element.

12. The actuator subassembly according to claim 1, wherein the biasing means provides a proportional return force for the shape memory alloy wire.

13. The actuator subassembly according to claim 1, wherein the shape memory alloy wire and the biasing means are physically separated by the first movable element.

14. A fluidic valve comprising the actuator subassembly according to claim 1.

15. The fluidic valve according to claim 14, wherein the second stationary surface provides a fluid-tight connection between the second movable element and the first movable element.

16. The fluidic valve according to claim 14, wherein the biasing means provides a proportional return force for the shape memory alloy wire.

17. The actuator subassembly according to claim 1, wherein the second stationary surface is interposed between the first and second movable elements separating them in a fluid-tight manner.

18. The actuator subassembly according to claim 1, wherein the one or more sets of permanent magnets have a drag force comprised between 1.5 and 5 times the force of the biasing means.

* * * * *